United States Patent
Densel et al.

[11] Patent Number: 6,123,317
[45] Date of Patent: Sep. 26, 2000

[54] COUPLING

[75] Inventors: David S. Densel, Whitehouse; Michael P. Wells, Holland, both of Ohio

[73] Assignee: Aeroquip Corporation, Maumee, Ohio

[21] Appl. No.: 09/370,822

[22] Filed: Aug. 9, 1999

[51] Int. Cl.[7] .............................. F16K 51/00; F16L 17/00
[52] U.S. Cl. ............................................ 251/148; 285/353
[58] Field of Search ................................ 285/353, 334.4, 285/339; 251/215, 214, 285, 148, 151

[56] References Cited

U.S. PATENT DOCUMENTS

| | | | |
|---|---|---|---|
| 3,323,874 | 6/1967 | Phillips | 285/DIG. 12 |
| 3,695,642 | 10/1972 | DeWoody | 285/353 |
| 4,599,903 | 7/1986 | Ferris | 73/756 |
| 4,688,831 | 8/1987 | Viehmann | 285/370 |
| 4,809,129 | 2/1989 | Hanson, III et al. | 361/284 |
| 4,974,308 | 12/1990 | Nimberger | 29/469 |
| 5,516,157 | 5/1996 | Williamson | 285/353 |

*Primary Examiner*—Kevin Shaver
*Assistant Examiner*—David A. Bonderer
*Attorney, Agent, or Firm*—Emch, Schaffer, Schaub & Porcello, Co., L.P.A.

[57] ABSTRACT

A coupling for sealing an outer cylindrical wall of a member of a fluid flow system extending along an axis. The coupling has a body and nut encircling the cylindrical wall which are configured to receive either a conventional O-ring or packing. The body includes a recess having a wall surface tapering at an angle in the range of 7° to 20° relative the axis and cooperates with the nut and cylindrical wall of the member to define an open area for receiving either an O-ring or packing.

21 Claims, 4 Drawing Sheets

COUPLING

BACKGROUND OF THE INVENTION

The present invention relates to a coupling for connecting various elements of a fluid flow system and is characterized in that it can be used with either an O-ring or with a packing for assuring a seal which prevents leakage of fluid flowing therethrough.

In the past it has been necessary to utilize one type of design for the coupling members when it was intended to utilize a packing for effecting a seal and a different design when utilizing an O-ring to effect such seal. As a result it was necessary for a user who had a need for valves or other items requiring couplings having packing type seals for some applications and O-ring type seals for other applications to maintain separate inventories of parts depending on whether such intended use required a coupling with a packing to effect the seal or an O-ring to effect the seal.

SUMMARY OF THE INVENTION

The present invention utilizes a design which permits the same coupling components to be utilized with a packing material to effect a seal where the end use application requires that type of seal and also to be utilized with an O-ring where the end use application requires an O-ring for effecting the seal. The present invention is particularly useful in couplings utilized for valves in air conditioning systems; however, it has broad application in other types of fluid flow assemblies.

IN THE DRAWINGS

DETAILED DESCRIPTION OF THE INVENTION

Figure 1:
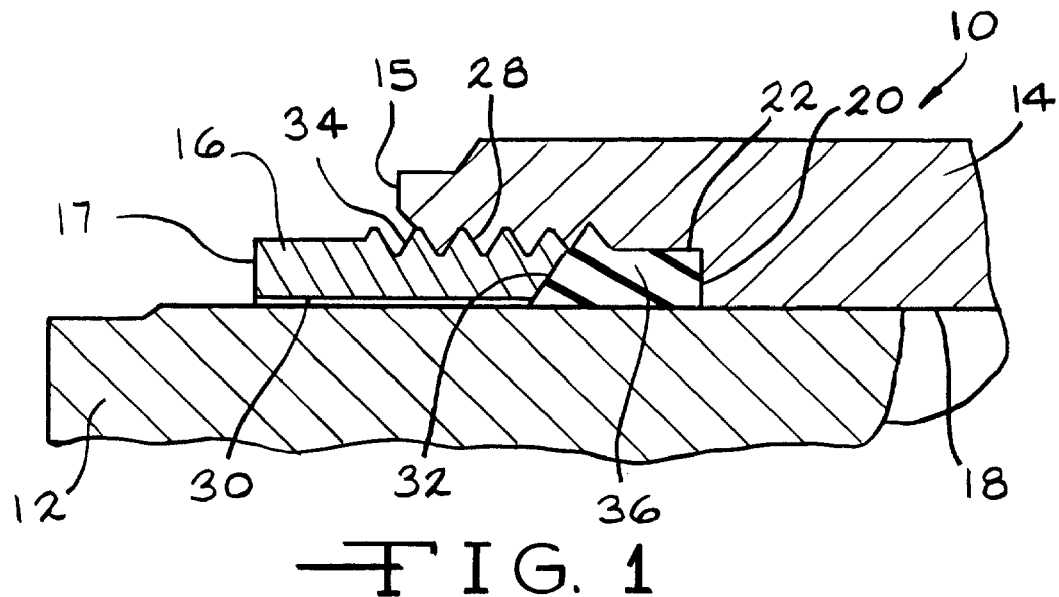
FIG. 1 is a schematic view in section showing prior art coupling components designed for use with packing material.

Referring to FIG. 1 there is shown a prior art coupling 10 of a type used as part of a valve having a stem 12 extending along an axis, which stem is rotatable between an open and a closed position. The valve includes a body 14 encircling the stem 12 and a packaging nut 16 threadedly engaged to the body 14. The body 14 has an inner wall 18 and an outwardly extending shoulder 20 followed by an axially extending step 22 joining with inwardly facing threads 28 which extend to the end 15 of the body 14. The packing nut 16 has an inwardly facing cylindrical wall section 30 which extends from an outer end 17 to a packaging material engagement end which is defined by a tapering wall section 32 which flares outwardly in a direction away from the outer end 17. The packing nut 16 also has outwardly facing threads 34 threadedly engaged to the inwardly facing threads 28 of the body 14.

The body 14 and packing nut 16 cooperate with the stem 12 to define a cavity in which packing material 36 is positioned. As the packing nut 16 is screwed into the body 14 reducing the size of the cavity in which the packing material 36 is positioned, it compresses the packing material 36 against the shoulder 20 while the tapering wall section 32 of the packing nut 16 urges the adjacent portion of the packing material 36 axially toward the radial shoulder 20 and also inwardly into sealing engagement with the stem 12. Such compression also urges the packing material 36 outwardly into sealing engagement with the axially extending step 22 and the threads 28 of the body 14.

Figure 2:
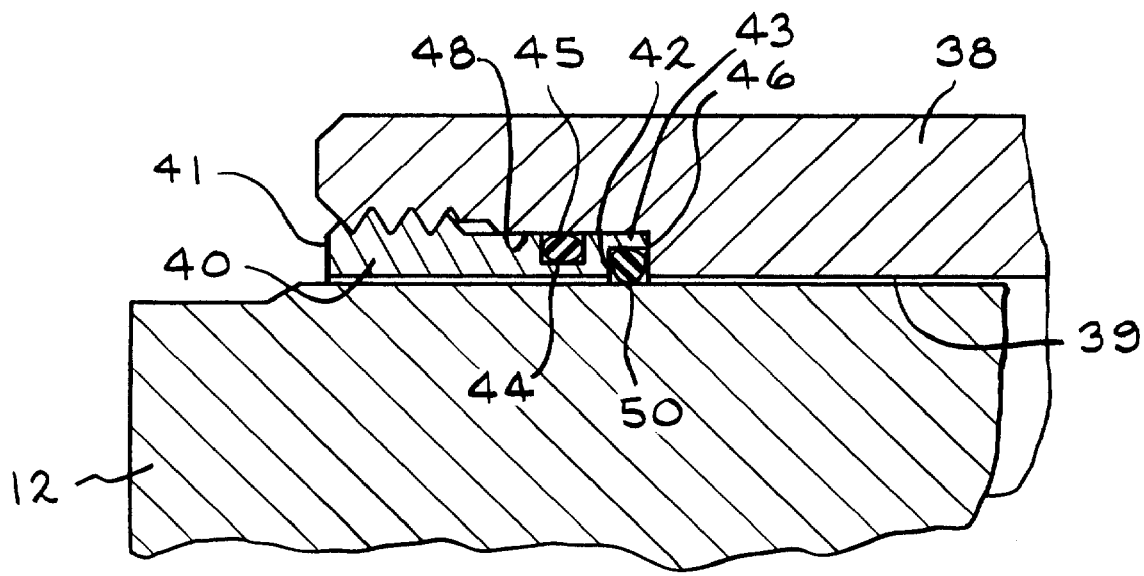
FIG. 2 is a view similar to FIG. 1 but showing prior art coupling components designed for use with O-rings.

FIG. 2 shows the construction of one type of prior art coupling designed for use with O-rings. In FIG. 2 there is shown a body 38 encircling the stem 12 and having engaged thereto a packing nut 40. The packing nut 40 is threadedly engaged to the body 38 and extends from an outer end 41 to an O-ring engagement end 42. The packing nut 40 has an outwardly facing annular groove 44 in which is positioned a first O-ring 45. The body 38 has a cylindrical wall surface 39 closely spaced from the stem 12, a radial shoulder 46 and an inwardly facing cylindrical wall section 48 extending axially therefrom.

Extending axially from the O-ring engagement end 42 of the packing nut, at its outer radial extent, is a short cylindrical wall 43 having an end which abuts the radial shoulder 46 of the body 38. The O-ring engagement end 42 of the packing nut 40 cooperates with the radial shoulder 46 of the body 38 to define, along with the inner surface of the short cylindrical wall 43 and the stem 12, a cavity in which is positioned a second O-ring 50. The first O-ring 45 is sealingly engaged to the cylindrical wall section 48 of the body and the second O-ring 50 is in sealing engagement with the radial shoulder 46 of the body 38, the O-ring engagement end 42 of the packing nut 40 and the stem 12.

Referring to FIGS. 3 through 7, there is shown details of the coupling of the present invention as a portion of a valve 50 of a type used in air conditioning systems. The valve 50 includes an upper body 52 and a lower body 53 brazed or otherwise joined thereto which together extend from a first end 54 to a second end 55. The lower body 53 extends from the second end 55 to an inner end 61 positioned in the upper body 52. The upper and lower bodies 52, 53 extend along an axis A and define a passageway in which is positioned a rotatable valve stem 60 for controlling the flow of refrigerant between a flow opening defined by the second end 55 and a radial port 56. The valve stem 60 has an enlarged head 62 and an elongated cylindrical portion 64. A first copper tube 57 is brazed in the opening at the second end 55 and a second copper tube 58 is brazed in the opening defined by the radial port 56. The tubes 57 and 58 may be attached to other members of a refrigeration system. The upper body 52 is also provided with a charge port member 59 for introducing refrigerant.

Figure 7:
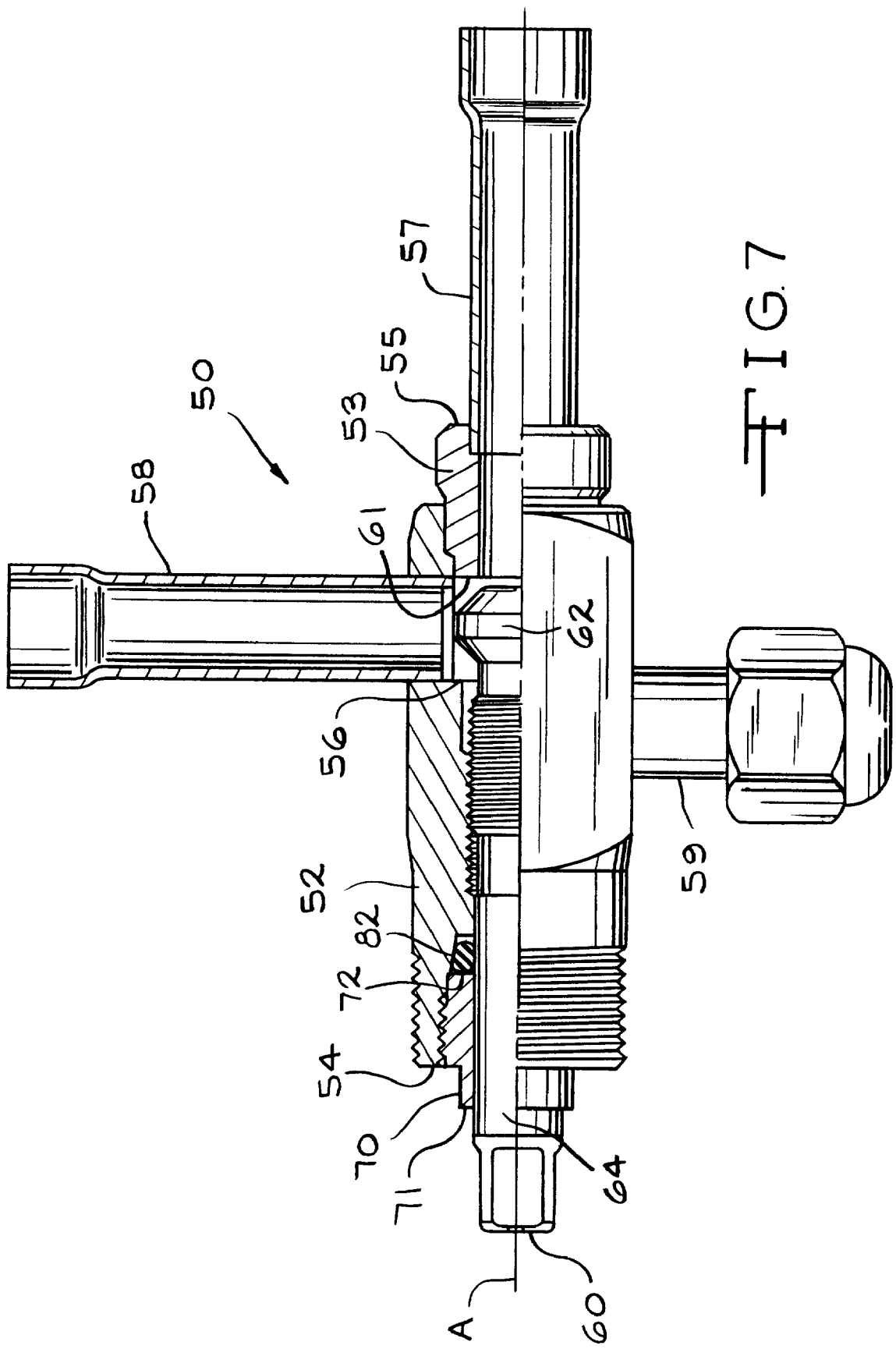
FIG. 7 is an elevational view, partly in section, of an assembled air conditioning valve incorporating the coupling feature of the present invention.

The valve stem 60 is threadedly positioned in the upper body 52 and is rotatable therein to effect axial movement between an open position as shown in FIG. 7 to a closed position at which its enlarged head 62 engages the inner end 61 of the lower body 53.

Threadedly engaged to the upper body 52 at its first end 54 is a packing nut 70 which encircles a cylindrical portion 64 of the valve stem 60 in closely spaced relationship therewith to permit free rotational and axial movement of the valve stem 60 therein. The packing nut 70 extends from a first end 71 to an engagement end 72 disposed at substantially right angles to the axis A. It has an inwardly facing cylindrical wall 73 slightly spaced from the exterior surface of the cylindrical portion 64 and outwardly facing threads 74 threadedly engaged to inwardly facing threads 51 of the upper body portion 52.

Figure 3:
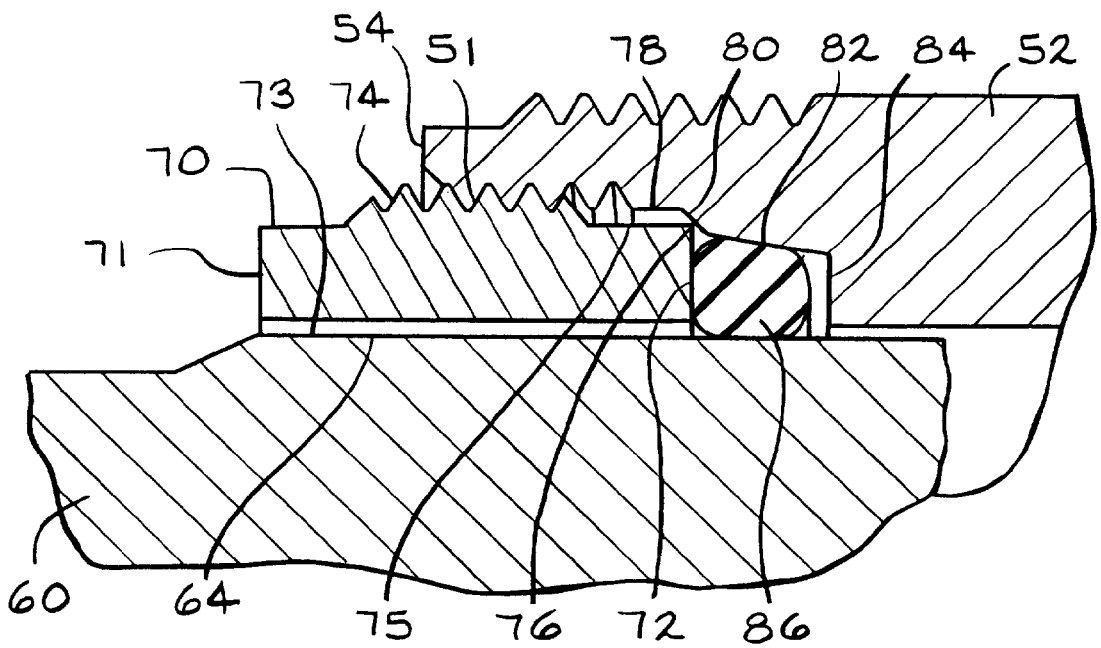
FIG. 3 is an elevational view, partly in section, showing the coupling of the present invention used with an O-ring to effect the seal.

Inwardly from the threads 51, the upper body 52 is provided with a short inwardly facing cylindrical wall surface 78 followed by a tapering wall section 80 which is disposed at an angle relative to the axis A in the range of 30° to 60° and preferably about 45°. The wall section 80 tapers inwardly toward the axis A in a direction extending away from the first end 54. This followed by an elongated tapering surface 82 which is disposed at an angle relative to the axis A in the range of 7° to 20° and preferably about 10°. The elongated tapering surface 82 tapers inwardly toward the axis A and extends from the tapering wall section 80 to a radially inwardly extending shoulder 84. As can be readily seen in FIGS. 3 and 4, the cylindrical wall surface 78, the tapering wall section 80, elongated tapering surface 82 and radial shoulder 84 of the upper body member 52 cooperate with the cylindrical portion 64 of the valve stem 60 and the engagement end 72 of the packing nut 70 to define a cavity in which may be positioned either a conventional O-ring 86 as shown in FIG. 3 or packing material 88 as shown in FIG. 4.

The packing nut 70 has a short outwardly facing cylindrical section 75 which joins the engagement end 72 to form a sharp corner 76. The short cylindrical section 75 has a diameter such that the corner 76 will abut the tapering wall section 80 assuming the nut 70 is threaded into the upper body 52 sufficiently far to make such engagement. This is the position shown in FIG. 3 when a conventional O-ring 86 is positioned in such cavity. Although the engagement end 72 of the packing nut 70 will contact and force the O-ring 86 into sealing engagement between the elongated tapering wall 82 and the outer surface 64 of the valve stem 60, the O-ring 86 will preferably not be forced into contact with the shoulder 84 by rotation of the packing nut 70 as it is desirable to leave a space between the O-ring 86 and the shoulder 84 in order to allow for expansion of the O-ring 86 during use of the valve 50. It is important, however, to achieve an adequate seal for the O-ring 86 between the elongated tapering wall 82 and the cylindrical portion 64 of the valve stem 60. The disposition of the elongated tapering surface 82 at an angle in the range of 7° to 20° permits such seal to be readily effected. The engagement of the corner 76 of the packing nut 70 against the tapering wall section 80 of the upper body 52 prevents damage to the O-ring from over compression while leaving room for expansion. The contact between the corner 76 and the tapering wall section 80 ensures against the formation of a gap through which the O-ring 86 may extrude upon a build-up of pressure.

Figure 4:
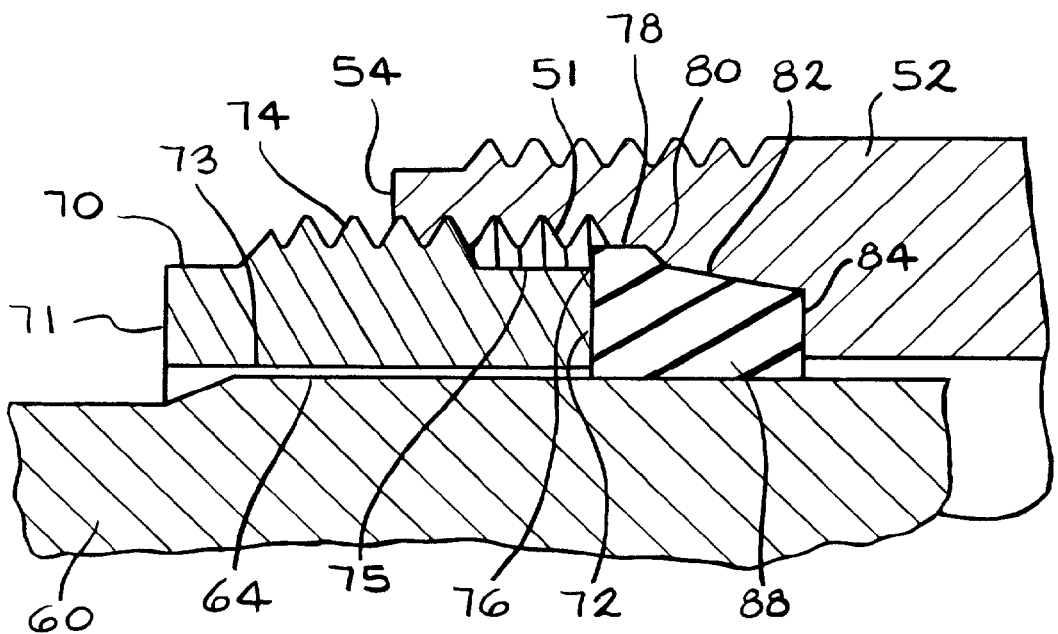
FIG. 4 is a similar to FIG. 3 but showing the same components used with material.
Figure 5:
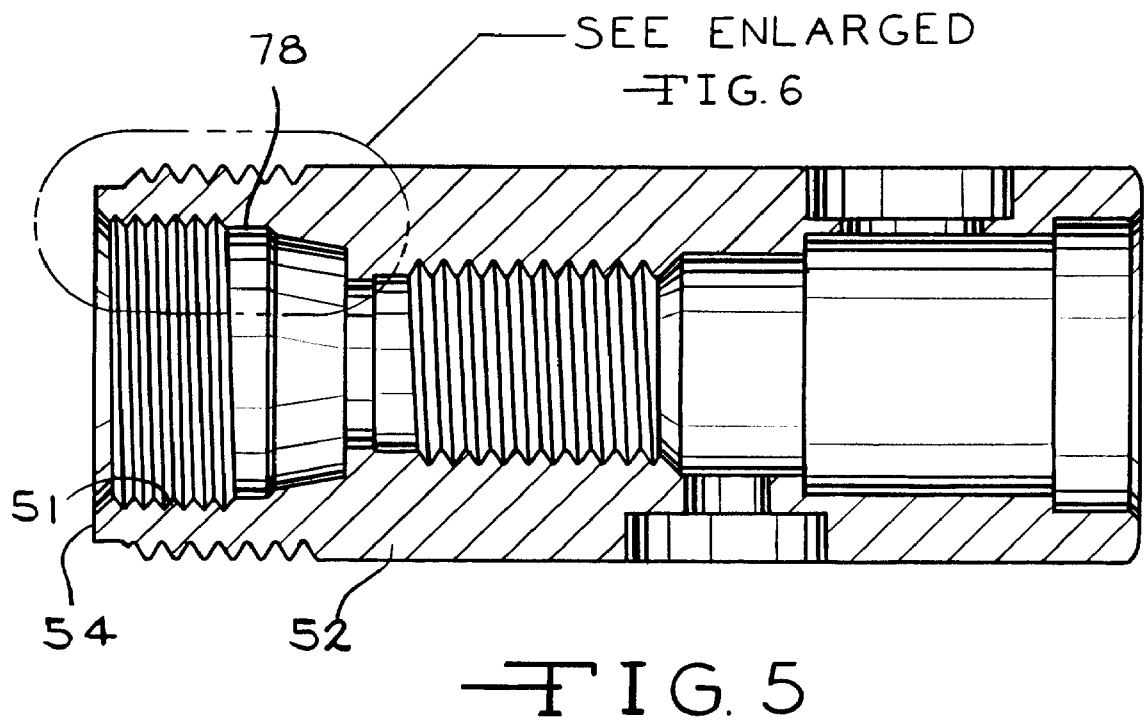
FIG. 5 is an elevational view, in section, of the body member of an air conditioning valve incorporating the coupling feature of the present invention.
Figure 6:
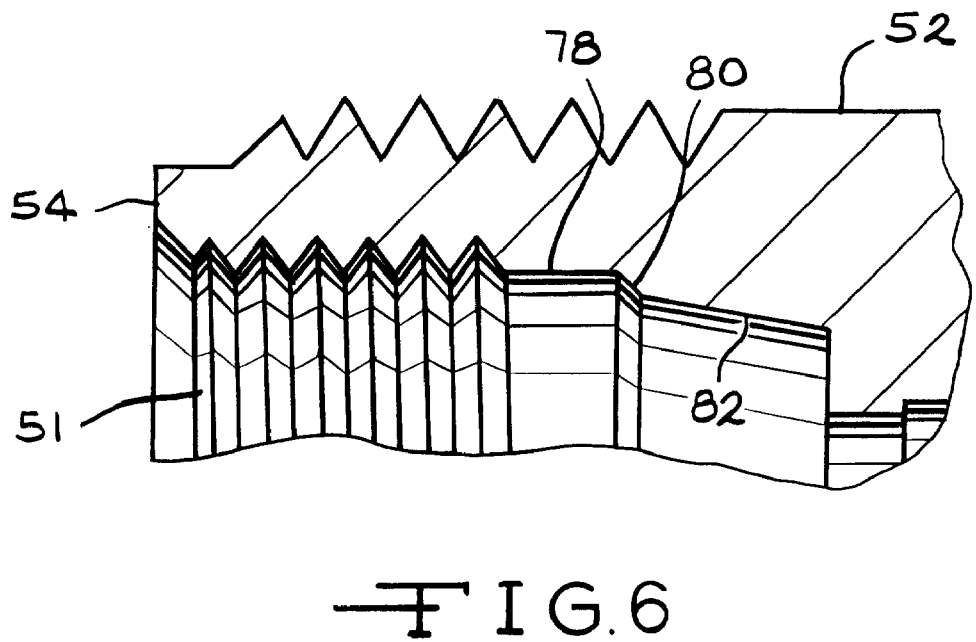
FIG. 6 is an enlarged fragmentary view of the body member shown in FIG. 5.

Referring to FIG. 4, there is shown the identical coupling used with packing 88. The packing 88 may either be one that is preshaped to the general configuration of the cavity defined by the surfaces 78, 80, 82 and 84 of the upper body 52, the cylindrical portion 64 of the stem 60 and the engagement end 72 of the packing nut 70 or it may be a less expensive type of packing which, as manufactured, has a rectangular cross-section and which becomes deformed and reshaped to the shape of the cavity as the packing nut 70 becomes tightly engaged to the upper body 52 with the packing 88 positioned therein. It will be noted from FIG. 4 that it is preferred to use packing having a sufficiently large cross-sectional size that a seal will be effected prior to the packing nut 70 being threaded to a position where the corner 76 engages the tapering wall section 80. Thus, as can be seen in FIG. 4 the corner 76 is spaced from the tapered surface 80. It is not necessary to provide space for expansion of packing 88.

Many modifications will be become apparent to those skilled in the art. Accordingly, the scope of the present application should be determined only by the scope of the claims appended hereto.

We claim:

1. A coupling for sealingly engaging a member having a cylindrical outer wall surface extending along an axis comprising:

(a) a nut encircling said member, said nut having outwardly facing threads and an engagement end; and
    (b) a body having inwardly facing threads engaged to said nut outwardly facing threads, said body including an inwardly facing wall surface encircling said member, a shoulder extending outwardly from said inwardly facing wall surface, and a tapering wall portion extending from said shoulder toward said inwardly facing threads at an angle in the range of 7° to 20° relative to said axis;

said shoulder and said tapering wall portion cooperating with said member cylindrical outer wall surface and said nut engagement end to define an open area for receiving a sealing member.

2. A coupling according to claim 1 in combination with a sealing member selected from the group consisting of (1) an O-ring and (2) packing.

3. A coupling according to claim 1 wherein said body member has a second tapering wall portion between said tapering wall portion and said inwardly facing threads, said second tapering wall portion being disposed at an angle relative to said axis greater than 20°.

4. A coupling according to claim 3 wherein said second tapering wall portion is disposed at an angle relative to said axis in the range of 30° to 60° and wherein said nut engagement end has an outer corner sized to engage said second tapering wall portion when an O-ring is sealingly engaged in said open area to prevent said nut from forcing said O-ring against said body shoulder.

5. A coupling according to claim 3 in combination with a sealing member, said sealing member being a member selected from the group consisting of (1) an O-ring and (2) packing.

6. A coupling for sealingly engaging a member having a cylindrical outer wall surface extending along an axis comprising:

(a) a nut encircling said member, said nut having outwardly facing threads, an engagement end and an outer corner at said engagement end;

(b) a body having inwardly facing threads engaged to said nut outwardly facing threads, said body including an inwardly facing wall surface encircling said member, a shoulder extending outwardly from said inwardly facing wall surface, a first tapering wall portion extending from said shoulder toward said inwardly facing threads at an angle in the range of 7° to 20° relative to said axis and a second tapering wall portion between said first tapering wall portion and said inwardly facing threads, said second tapering wall portion being disposed at an angle relative to said axis greater than 20°;

said shoulder and said tapering wall portion cooperating with said member cylindrical outer wall surface and said nut engagement end to define an open area for receiving a sealing member.

7. A coupling according to claim 6 wherein said second tapering wall portion is disposed at an angle relative to said axis in the range of 30° to 60° and wherein said nut engagement end outer corner is sized to engage said second tapering wall portion when an O-ring is sealingly engaged with said first tapering wall portion and said member cylindrical outer wall surface to prevent said nut from forcing said O-ring against said body shoulder.

8. A coupling according to claim 6 in combination with a sealing member, said sealing member being a member selected from the group consisting of (1) an O-ring and (2) packing.

9. A valve assembly comprising (a) a body extending along an axis from a first end to a second end and having an axial passageway, said body having inwardly facing threads extending inwardly from said first end, a shoulder spaced axially from said threads and positioned closer to said axis than said threads and a tapering wall portion extending from said shoulder toward said inwardly facing threads at an angle of in the range of 7° to 20° relative to said axis;

(b) a valve stem positioned in said body; and (c) a nut encircling said valve stem, said nut having outwardly facing threads engaged to said body threads and an engagement end;

said shoulder and said tapering wall portion cooperating with said valve stem and said nut engagement end to define an open area for receiving a sealing member.

10. A valve according to claim 9 in combination with a sealing member selected from the group consisting of (1) an O-ring and (2) packing.

11. A valve according to claim 10 wherein said body member has a second tapering wall portion between said tapering wall portion and said inwardly facing threads, said second tapering wall portion being disposed at an angle relative to said axis greater than 20°.

12. A valve according to claim 11 wherein said second tapering wall portion is disposed at an angle relative to said axis in the range of 30° to 60° and wherein said nut engagement end is sized to engage said second tapering wall portion when an O-ring is sealingly engaged between said tapering wall potion and said valve stem.

13. A valve according to claim 12 wherein said nut engagement end engages said second tapering wall portion while permitting space for expansion between said O-ring and said body shoulder.

14. A coupling according to claim 13 in combination with a sealing member selected from the group consisting of (1) an O-ring and (2) packing.

15. A valve according to claim 11 in combination with a sealing member, said sealing member selected from the group consisting of (1) an O-ring and (2) packing.

16. A valve assembly capable of using an O-ring or packing comprising (a) a body extending along an axis from a first end to a second end and having an axial passageway, said body having inwardly facing threads extending inwardly from said first end, a shoulder spaced axially from said threads and positioned closer to said axis than said threads, a first tapering wall portion extending from said shoulder toward said inwardly facing threads at an angle in the range of 7° to 20° relative to said axis and a second tapering wall portion between said first tapering wall portion and said inwardly facing threads, said second tapering wall portion being disposed at an angle relative to said axis greater than 20°;

(b) a valve stem positioned in said body; and (c) a nut encircling said valve stem, said nut having outwardly facing threads engaged to said body threads and an engagement end with an outer corner sized to engage said second tapering wall portion when an O-ring is positioned in an open area defined by said shoulder, said first tapering wall portion, said valve stem and said nut engagement end and is sealingly engaged to said first tapering wall portion and to said valve stem, said engagement of said outer corner with said second tapering wall portion permitting space for expansion between said O-ring and said shoulder.

17. A valve according to claim 16 combination with a sealing member selected from the group consisting of (1) an O-ring and (2) packing.

18. A valve according to claim 16 wherein said second tapering wall portion is disposed at an angle relative to said axis in the range of 30° to 60°.

19. A valve assembly capable of using an O-ring or packing comprising (a) a body extending along an axis from a first end to a second end and having an axial passageway, said body having inwardly facing threads extending inwardly from said first end, a shoulder spaced axially from said threads and positioned closer to said axis than said threads, a first tapering wall portion extending from said shoulder toward said inwardly facing threads and a second tapering wall portion between said first tapering wall portion and said inwardly facing threads, said second tapering wall portion being disposed at a greater angle relative to said axis than said first tapering wall portion;

(b) a valve stem positioned in said body; and (c) a nut encircling said valve stem, said nut having outwardly facing threads engaged to said body threads and an engagement end with an outer corner sized to engage said second tapering wall portion when an O-ring is positioned in an open area defined by said shoulder, said first tapering wall portion, said valve stem and said nut engagement end, said engagement of said outer corner with said second tapering wall portion permitting space for expansion between said O-ring and said shoulder and causing said O-ring to sealingly engage said valve stem and said first tapering wall portion.

20. A valve according to claim 19 wherein said first tapering wall portion is disposed at an angle in the range of 7° to 20° relative to said axis and said second tapering wall portion is disposed at an angle relative to said axis in the range of 30° to 60°.

21. A coupling for sealingly engaging, either with an O-ring or packing, a member having a cylindrical outer wall surface extending along an axis comprising:

(a) a nut encircling said member, said nut having outwardly facing threads, an engagement end and an outer corner at said engagement end;

(b) a body having inwardly facing threads engaged to said nut outwardly facing threads, said body including an inwardly facing wall surface encircling said member, a shoulder extending outwardly from said inwardly facing wall surface, a first tapering wall portion extending from said shoulder toward said inwardly facing threads and a second tapering wall potion between said first tapering wall portion and said inwardly facing threads, said second tapering wall portion being disposed at a greater angle relative to said axis than said first tapering wall portion, said nut outer corner being sized to engage said second tapering wall portion when an O-ring is sealingly engaged between said member cylindrical outer wall surface and body first tapering wall portion to prevent said nut from forcing said O-ring against said body shoulder.

* * * * *